March 8, 1966 D. W. CHAPIN ETAL 3,239,139

PNEUMATIC ANALOG COMPUTER

Filed Dec. 4, 1961 4 Sheets-Sheet 1

INVENTORS
DONALD W. CHAPIN
DONALD H. FISCHER
JOHN C. WHITE
BY
Francis V. Bebee
ATTORNEY March 8, 1966 D. W. CHAPIN ETAL 3,239,139

PNEUMATIC ANALOG COMPUTER

Filed Dec. 4, 1961 4 Sheets-Sheet 2

INVENTORS
DONALD W. CHAPIN
DONALD H. FISCHER
JOHN C. WHITE

BY Francis J. Bebee
ATTORNEY

PNEUMATIC ANALOG COMPUTER

Filed Dec. 4, 1961 4 Sheets-Sheet 3

INVENTORS
DONALD W. CHAPIN
DONALD H. FISCHER
JOHN C. WHITE
BY
Francis J. Bebee
ATTORNEY

PNEUMATIC ANALOG COMPUTER

Filed Dec. 4, 1961 4 Sheets-Sheet 4

INVENTORS
DONALD W. CHAPIN
DONALD H. FISCHER
JOHN C. WHITE
BY
Francis J. Gehee
ATTORNEY United States Patent Office 3,239,139
Patented Mar. 8, 1966

3,239,139

PNEUMATIC ANALOG COMPUTER

Donald W. Chapin, Scottsdale, Donald H. Fischer, Phoenix, and John C. White, Mesa, Ariz., assignors to The Garrett Corporation, Los Angeles, Calif., a corporation of California Filed Dec. 4, 1961, Ser. No. 156,810
17 Claims. (Cl. 235—200)

This invention relates to analog computers, and aims to provide a versatile fluid pressure operated computer unit which is particularly adaptable for use in the process industries and is made up of a plurality of components arranged to perform accurately a variety of mathematical computations.

Pneumatically operated computers have been available in the past and have been used for some time by the process industries, such as in oil and chemical processing operations. In such operations it is often necessary to perform certain mathematical computations where the variables appear as changes in pressure of an operating fluid, and to obtain the result in the form of another fluid pressure. Pneumatic or fluid pressure operated computing apparatus obviously lends itself well to this kind of situation.

One type of computer that has been used in the process industries makes use of normally available 3–15 p.s.i. pneumatic inputs in a force balancing system whereby simple analog elements can be applied to perform simple mathematical computations, such as addition, subtraction, multiplication, division, square root, and the like. Such computers, however, are usually only adaptable to a single purpose and the single set of conditions for which they were designed. In the event that there are changes in the operating conditions, or in the method of computation originally contemplated, it is necessary to redesign the computer and substitute different units for the different conditions. This lack of flexibility, coupled with a rather low rate of accuracy in operation, has greatly limited the use of pneumatic analog computers in the process industries.

This invention is based on the discovery that it is possible to design a flexible and accurate fluid pressure operated computing unit by utilizing as basic components of the unit one or more movable and adjustable signal carts, a servo positioner, a force balancing lever, a pneumatic sensor, and a pneumatic resistance and capacitance. With a unit having such a combination of components, the basic components may be arranged to perform any of a multiplicity of mathematical functions or computations, including addition, subtraction, multiplication, division, square root, integration, differentiation, and various combinations and extensions of such functions.

It is, therefore, one of the principal objects of this invention to provide a versatile fluid pressure operated analog computer which is both accurate and flexible in its operation, and subject to none of the difficulties that have been encountered in prior art computers of the same general type.

Another object of this invention is to provide a fluid pressure operated analog computer which is adapted to be assembled in units, including a plurality of components which may be arranged to perform a variety of mathematical computations.

A further object of this invention is to provide an accurate fluid pressure operated analog computer which is especially adaptable for automating industrial processes involving towers, reactors, heat exchangers, and the like, where a small portion or a small loop of the process can be expressed in the form of an equation.

Another object of the invention is to provide a pneumatic analog computer which is made up of one or more basic units capable of performing a plurality of mathematical functions and in which each unit comprises a main lever having a stationary fulcrum, a pneumatic sensor associated with the lever, a plurality of signal carts adapted to be positioned on either or both sides of the lever and on either or both sides of the stationary fulcrum, and one or more servo positioners if movement of a signal cart is needed for the function to be performed.

Still another object of the invention is to provide a pneumatic analog computer according to the last preceding paragraph in which the principle of positive feedback is employed in the construction and operation of the servo positioner so as to increase the forward gain of the actuator and thereby reduce or eliminate error between input and output thereof, thus increasing the accuracy of the mathematical computations performed by the apparatus.

It is another object of this invention to provide a pneumatic analog computer which includes a fulcrumed lever, movable pneumatic carts coacting therewith, and a pneumatic sensing device which is arranged to sense the position of the lever and provide full feedback to the pneumatic carts.

A further object of the invention is to provide a pneumatic analog computer wherein a pneumatic time constant may be provided for certain computations by means of the product of a pneumatic resistance which varies inversely with the average pressure level and a pneumatic capacitance wherein the volume of the capacitance increases with the pressure level.

The above and other features and objects of the invention will be apparent from the following detailed description and the accompanying drawings, in which.

Figure 1:
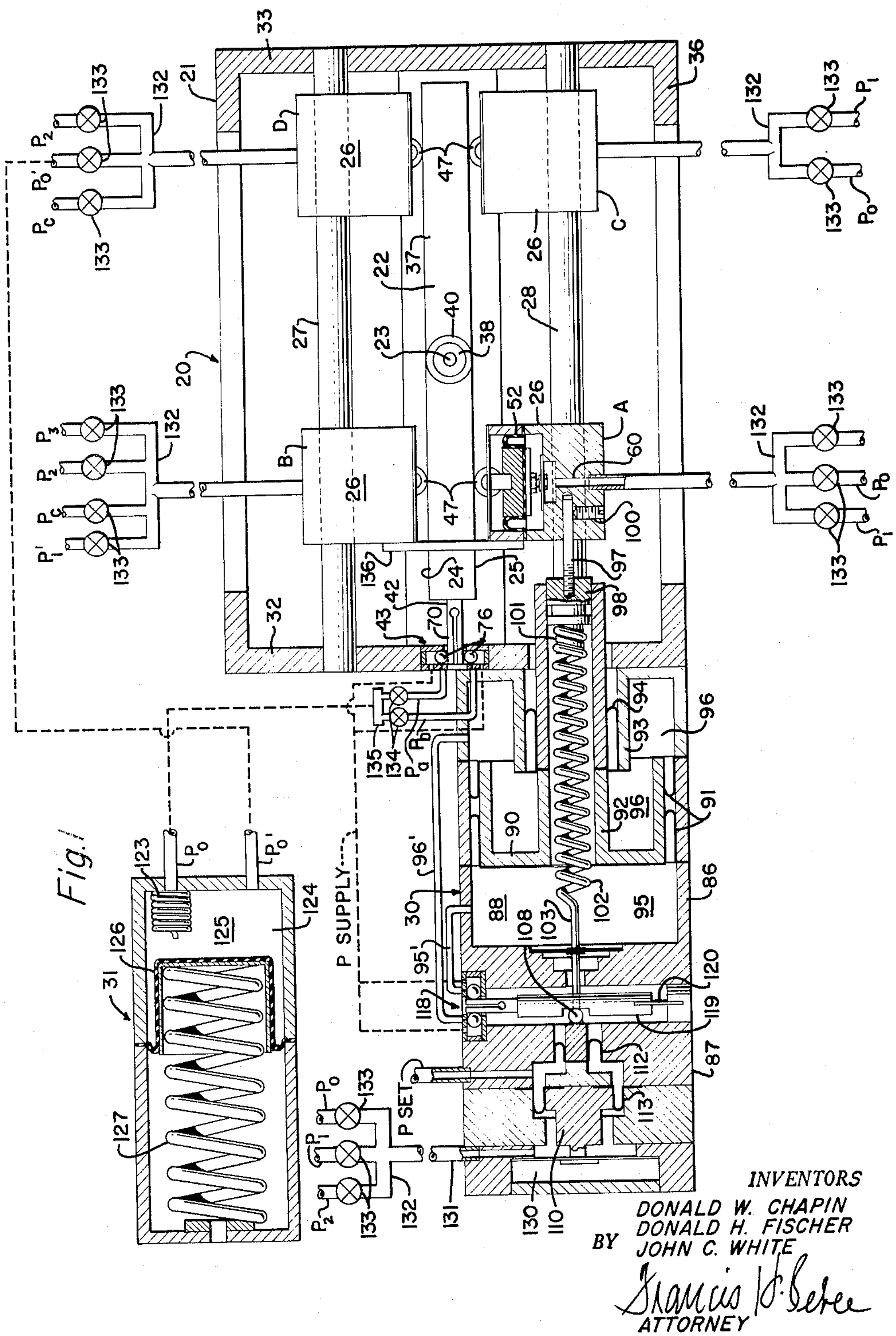
FIG. 1 is a vertical sectional view, largely schematic, of one form of computer unit or module constructed in accordance with the principles of this invention.

Referring now to the drawings, and particularly FIG. 1, a flexible pneumatic analog computer unit 20 embodying the features of this invention comprises a lever box or supporting frame 21 having a force balancing lever 22 mounted therein for limited rotation about a centrally disposed stationary fulcrum 23. Forces may be applied to either or both the top and bottom sides 24 and 25, respectively, of the lever 22 and on either or both sides of the stationary fulcrum 23 by means of a plurality of force or pressure applying carts 26. In FIG. 1, two of the carts 26, designated as B and D, are arranged for applying forces against the upper side 24 of the lever 22 on each side of the fulcrum 23. Said carts are adjustably or movably mounted on upper tracks 27 suitably mounted or secured in the vertical side walls or members of the rectangular frame 21. Similarly, two carts 26, designated A and C, are arranged for applying forces against the lower or bottom side 25 of the lever 22 on each side of the fulcrum 23. These carts are adjustably positioned on lower tracks 28 which are parallel to the tracks 27 and also mounted in the side walls of the frame 21.

Depending upon the particular type of calculation or function to be performed by the computer unit 20, said unit may also include a servo-actuator 30 for positioning one or more of the carts 26 in response to a predetermined input pressure to the servo. When it is desired to perform differentiation or integration with the computer, some means of providing resistance and capacitance (RC) is also required, and this is accomplished in the present instance by the component 31 shown in FIG. 1. Thus, the flexible computer unit comprises a plurality of components: (1) a lever box 21, including a supporting frame, and a lever having a stationary fulcrum and a sensing element; (2) a plurality of carts 26 for applying forces which are sensed by the sensing element so that the lever may be balanced; (3) a servo-actuator 30 for automatically moving one or more carts during and as part of a computation; and (4) a combination resistance and capacitance 31. Each of these components will now be described in detail.

THE LEVER BOX

Figures 2, 4, 5:
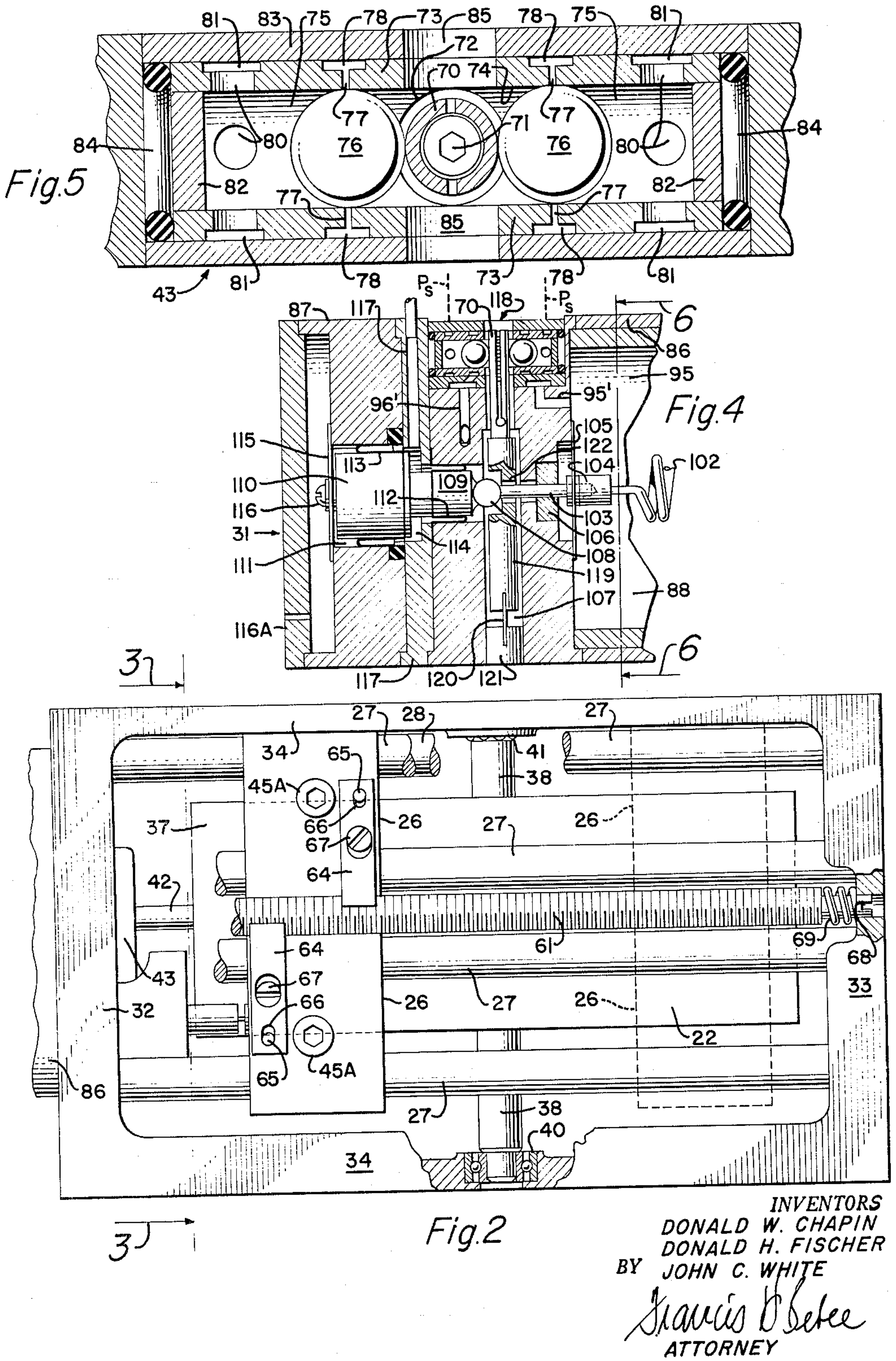
FIG. 2 is a top plan view of the lever box and associated parts shown schematically in FIG. 1.
FIG. 4 is a detail vertical sectional view of the end of the servomechanism shown in FIG. 1.
FIG. 5 is an enlarged detail sectional view of the type of sensing valve used with both the lever and servo, as shown in FIGS. 1 and 4.
Figure 3:
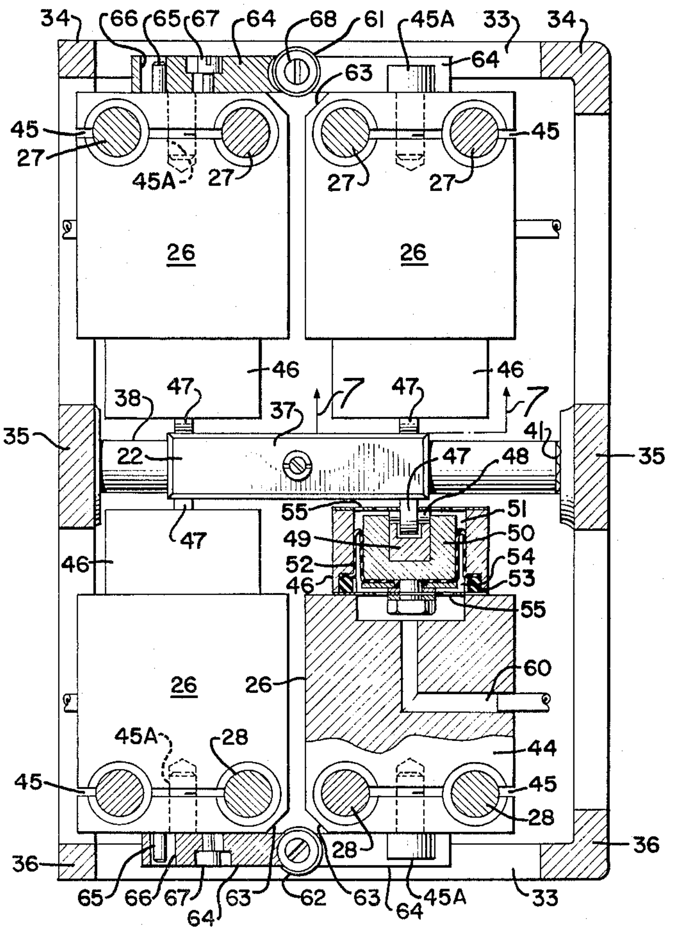
FIG. 3 is a vertical cross-sectional view, taken along the line 3—3 of FIG. 2.

As best shown in FIGS. 2 and 3, the supporting frame or lever box 21 may be a three-dimensional, rectangular die casting, comprising left- and right-hand end walls 32 and 32, respectively. These end walls are interconnected by upper, middle, and lower horizontal cross supports, stringers or members 34, 35 and 36, respectively, there being front and rear cross supports at each level (FIG. 3). The force balancing lever 22 comprises a rectangular platform 37 having its fulcrum 23, consisting of a centrally disposed shaft 38 which is rotatably supported in suitable bearings 40, provided in the front and rear middle cross members 35. A conventional wave washer 41 may be used to take up any undesirable slack in the axial movement of the shaft. The right-hand end of the fulcrumed lever 22 (FIGS. 1 and 2) is free, and the left-hand end has a reduced portion 42 which is inserted into a sensing mechanism 43, shown in detail in FIG. 5 and to be more fully described hereinafter. The upper tracks 27, in the example illustrated, are four in number, and all are arranged at substantially the same level, which is approximately the height of one of the carts 26, above the fulcrum platform 37, with two being on each side of the center line of said lever. Lower tracks 28, also four in number, are correspondingly spaced below and on either side of the fulcrum platform 37.

In FIG. 3, it will be seen that each track member is circular in cross section and two are provided for each set of carts 26. It will also be noted that one cart 26 is shown in each quadrant in FIG. 3, and that two are shown in full lines and two in dashed lines in FIG. 2, making a total of eight carts with room for even more should the complexity of the mathematical equation or formula being solved require them.

THE FORCE APPLYING CARTS AND SENSING MECHANISM

Each of the carts 26 consists of a main body portion or carriage 44 having longitudinal openings therein lined with suitable bushings for the reception of the track members 27 or 28. Each carriage 44 is split or notched at 45 in line with the longitudinal openings for the tracks, so that said carriage may be squeezed into firm locked contact with the tracks by a locking screw 45A. A piston or pressure chamber housing 46 is attached to the carriage 44 and positioned so that a force applying roller or wheel 47 may bear against either the top or bottom surface of the lever platform 37 and act to eliminate friction as the cart is moved. Roller 47 is provided with an axle 48 which rides in an indentation or bearing 49 provided in a movable piston 50 which is arranged for limited movement in a chamber 51 formed in the housing 46. A constant area diaphragm 52, made of a strong stable material such as polyurethane so that no reinforcing fabric is required, is sealed against the housing by an O-ring 53, and against the inner side of the piston by a retainer plate and screw 54.

Figure 7:
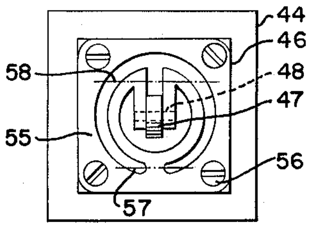
FIG. 7 is a detail plan view, taken along the line 7—7 of FIG. 3.

The piston is resiliently maintained in proper position in its chamber by a pair of special flat springs 55, the outer one being attached to the piston housing by suitable screws 56 (FIG. 7). The springs used are in the form of a double cantilever which allows vertical movement but prevents sideward movement and eliminates hysteresis. As shown in FIG. 7, the outside of the spring is circular in shape to permit accurate positioning while the double cantilever allows vertical movement without horizontal distortion. Dot and dash lines 57 and 58 indicate the lines of flexure. With the spring in a horizontal position, as shown in FIG. 3, it will be apparent that the leverage from 57 to 58 would cause line 58 to move on a downward curve when the axle 48 is pushed upwardly; and the leverage from 58 to 48 will move on an upward curve. The dimensions of the spring loops are such that these two movements cancel each other and there thus is an effective straight line movement of the force applying wheel or roller 47. Such movement of the roller is produced by fluid pressure applied against the diaphragm 52. Such pressure is supplied to the diaphragm chamber through suitable passages 60 in the carriage 44 from a source and in a manner to be described more fully hereinafter.

It has already been stated that one of the principal features of the invention resides in the flexibility of the computer unit and this is in part achieved by the adjustibility of the individual carts. As shown in FIGS. 2 and 3, upper and lower elongated adjusting screws 61 and 62 extend between the end walls 32 and 33 of the lever box, at the upper and lower sides thereof, and are disposed in a position between the forward and rear carts. Each cart is beveled or cut away at 63 along the edge adjacent the screw, to prevent interference with the adjusting screw, and a slidable connecting member 64 is provided on the adjacent horizontal surface of the carriage 44. The connecting member 64 is grooved or threaded at its end near the adjusting screw 61 or 62 for engagement therewith, and is manually movable between engaged and inoperative positions. A pin 65, mounted in the carriage 44, and slot 66 guide and limit the movement of the connecting member 64 which may be locked in either adjusted position by a set screw 67. When it is desired to change the position of an individual cart 26 on the upper tracks 27, for example, first its clamping screw 45A is loosened and then the connecting member 64 of the cart to be moved is put into engaged position on the adjusting screw 61, and said screw may be turned by inserting a screwdrive in a reduced grooved end 68 thereof. This will effect movement of the cart in either direction; and when the desired adjustment is completed, the clamping screw 45A is tightened and the connecting member 64 moved back to unengaged position. A spring 69 may be provided around the reduced end of the screw to resiliently hold said screw in proper position.

It will be understood that if the computer unit is set up with only two carts, such as the carts A and B shown in FIG. 1, these carts will apply opposing forces to the lever 22. The sensing mechanism 43 associated with the lever 22 detects any imbalance of the lever, according to the present invention, and feeds pressure back to one of the carts or to the servo-actuator 30 so as to vary the output pressure until balance is attained. One form of the sensing mechanism 43 is shown on an enlarged scale in FIG. 5 turned 90° to a horizontal position; the same type of sensor is also used in the servo-actuator 30, as will be described more fully hereinafter.

Sensing mechanism 43 for lever 22 is actuated by a hollow, bifurcated actuating finger 70 at the end of the reduced portion 42 of the lever. The inside surface of the hollow finger 70 is tapered inwardly and threaded so that an adjusting screw 71 threaded therein will cause it to spread and increase slightly in width for adjustment purposes. This finger is arranged to extend through an opening 72, centrally located in the side of a valve housing 73, into a cylindrical bore 74 in said housing, thus dividing said bore into a pair of identical but oppositely disposed valve chambers 75. Each valve chamber has a spherical valve member or ball 76 located therein in contact with one of the forked portions of the actuating finger 70 and, when in this position, closing a circumferentially extending slot 77 which constitutes an outlet port and is connected with an annular groove 78. It will be apparent that turning the adjusting screw 71 will adjust the positions of the balls with respect to the associated slot 77. The opposite end of each chamber 75 is provided with a plurality of inlet ports 80 connected to an annular groove 81. The outer ends of the valve chambers are closed by suitable plugs 82, and the valve housing 73 is mounted in an outer cover, support or housing 83 which closes the grooves 78 and 81 to form passages. This entire assembly may then be removably positioned between resilient O-rings 84 and properly located in the appparatus. One of these sensing devices 43 is located in the end wall 32 of the lever box, and another forms part of the servo-actuator, as will presently appear.

When the lever 22 is balanced and the parts are thus in the FIG. 5 positions, input pressure entering ports 80 merely presses against the valves 76, holding them in contact with the actuating finger 70 and maintaining outlet slots 77 closed. If, however, the actuating finger 70 moves to the right (FIG. 5—or down in FIG. 1), the right-hand ball valve 76 is moved to a position that allows the associated outlet port 77 to vent to the atmosphere through ports 85, thereby permitting the pressure in groove 78 to approach atmospheric. Simultaneously, in the left-hand chamber 75 (upper in FIG. 1) the ball 76 moves to the right so that fluid under input pressure will flow through the exposed output port and increase pressure in its associated groove 78. In this way, the effective input and exhaust ports of each chamber 75 are changed simultaneously and oppositely. This provides greatly increased sensitivity and also allows a greater quantity of air to be controlled, resulting in lower output resistance to flow or a higher frequency response. Furthemore, with the right-hand ball moved to the right, the pressure at the associated output slot 77 will fall because there is a slight input air flow around the ball. This air flow around the ball produces a suction (Bernoulli) effect at slot 77 so that output pressure actually falls below atmospheric, thereby producing increased range of linearity in the performance curve of the sensing device; and such air flow around the ball keeps it free and centered in the cylindrical chamber.

As described above, the two ball valves associated with an actuating finger are arranged so that their effects oppose each other. This provides a "push-pull" output in which one output increases for a given input movement of the finger 70 while the other decreases, and vice versa. In this way, variation and opposition effects of the supply pressure are nullified.

In the FIG. 1 use of the sensing element 43, the output pressure is fed to one of the carts 26 through its passage 60 to act on the cart diaphragm 52, causing wheel 47 to press against the lever 22. For this purpose, the left-hand output passage 78 (FIG. 5—upper FIG. 1) is connected through a suitable flexible hose to the passage 60 in cart A, for example, and the corresponding right-hand passage may be plugged or otherwise blocked. Which passage is blocked will depend on the mathematical function to be performed and the location of the balancing cart which is to receive the output pressure.

THE SERVO-ACTUATOR

The servo-actuator 30 is a device which positions a piston and its load (in this case, one or more of the carts 26) in response to an input pressure. Referring to FIGS. 1 and 4, it will be observed that the servo-actuator, which is mounted on the end wall 32 of the lever box, comprises a forward, output, or piston housing portion 86 and a rearward or input housing portion 87, which are cylindrical in shape and interconnected by suitable fluid pressure conduits which will be described below. The piston or output housing 86 has an inner cylindrical chamber 88 in which a movable wall 90 in the form of a cylindrical piston is disposed for movement. This piston is sealed from the inner wall of the housing with a double diaphragm 91 and is provided with an elongated, hollow, axial shaft portion 92 which is suitably sealed from an inwardly projecting neck 93 by a diaphragm 94. Piston 90 divides the inner chamber 88 into first and second output chambers 95 and 96, so that a pressure differential between them will cause the piston to move in the housing. Such movement may be transmitted to one of the force applying carts 26 by a connecting rod 97, threaded at one end into a special fitting 98 mounted in the outer end of the hollow shaft 92 and secured at its other end to the cart housing by a set screw 100.

Figure 6:
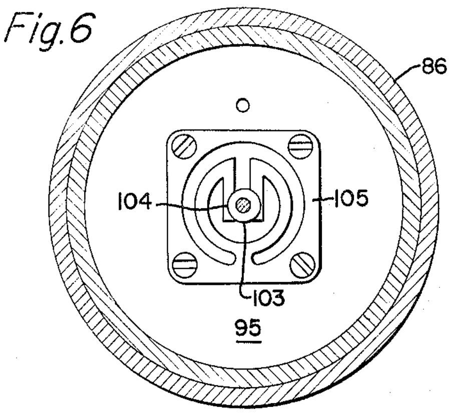
FIG. 6 is a detail sectional view, taken along the line 6—6 in FIG. 4, showing the double cantilever spring used in the computer unit.

Special fitting 98 has an inner threaded portion 101 to adjustably receive one end of an elongated tension feedback spring 102 which has its other end straightened into a rod portion 103. By turning the spring on the threaded portion 101, both the length and spring rate of the spring may be adjusted. As best shown in FIGS. 4 and 6, rod 103 is provided with a lug 104 for contact with the center of a double cantilever spring 105, like the spring 55 shown in FIG. 7 and described above, having its peripheral portions in contact with the end wall of the chamber 95. Rod 103 then passes through an opening in the housing 87, which is sealed with a bushing 106, and into a vertically disposed cylindrical passage 107. At that point the end of rod 103 is connected to a rod or knife edge member 108 mounted on the end of a shaft 109 connected to a pressure responsive piston 110. Shaft 109 and piston 110 are arranged and sealed in a suitably shaped axial chamber 111 with a forward shaft sealing diaphragm 112 and a rearward piston sealing diaphragm 113. The space between these diaphragms forms a pressure chamber 114. Another double cantilever spring 115 is in operative contact with the rearward end of piston 110 through a screw 116. The assembly, consisting of the rod 103, piston 110, and associated parts, is thus resiliently centered and held in place in the housing 87 by a pair of double cantilever springs 105 and 115, having the same advantages and features of operation as the spring 55 shown in FIG. 7. The end of housing section 87 may be closed with a cover member 116A having an opening therein so as to subject the outside of piston 110 and diaphragm 113 to ambient pressure. This is different from the construction shown in FIG. 1, which will be more fully described hereinafter.

It will be apparent that the force on the piston 110 created by the pressure differential between that in chamber 114, which is subjected to input pressure through a passage 117, and ambient, will be balanced against the force in feed-back spring 102 created by the position of piston 90. Such balance is sensed by a second sensing device 118 shown in FIG. 4 and identical with that shown in FIG. 5 and described above but having the outlet ports 77 thereof connected to the chambers 95 and 96, by lines 95' and 96', respectively. Like parts are designated with like names and reference numerals, both in the drawing and the following description. In FIG. 4, the bifurcated actuating finger 70 is mounted on the end of a cantilever rod 119 housed in chamber 107 and spring mounted and biased to the left by a leaf spring 120. This spring is suitably connected to the cantilever rod 119 at one end and fixed in a plug 121 fitted into and closing the lower end of the chamber 107. An aperture 122 is provided in the rod 119 and sized so that the rod 103 may extend through it and allow the rod 108 to seat on the rearward edge thereof as illustrated.

Figure 8:
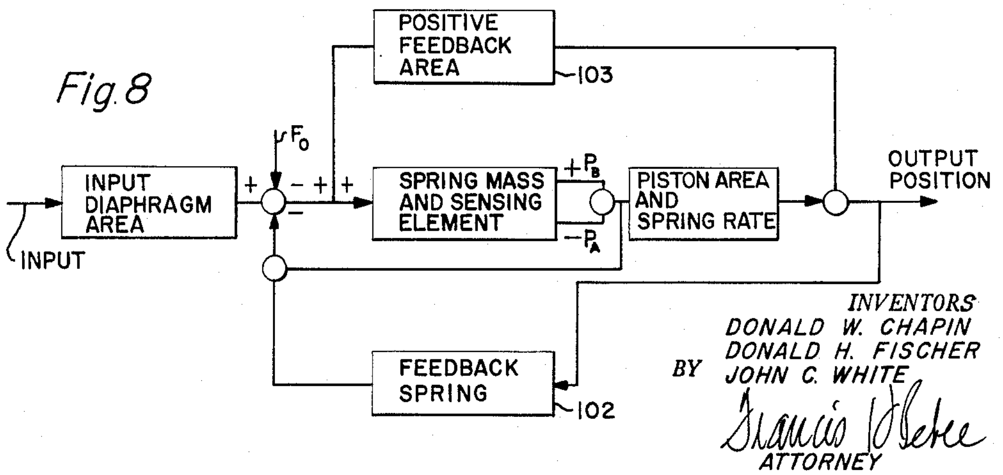
FIG. 8 is a block diagram of various relationships in the operation of the pneumatic servo-actuator.

There are several features of the servo-actuator, as just described, which make it highly sensitive and render its operation more accurate than other servomechanisms that have been available in the past. Some of these features are illustrated in the block diagram of FIG. 8, where it will be noted that the input consists of the force on piston shaft 109 resulting from the application of the input pressure against the diaphragm stack 112, 113 (FIG. 4). This force is counteracted by the force from feedback tension spring 102, the amount of force depending upon the degree of contraction or extension of the spring 102. If these two forces are not in balance, the sensing lever 119 is caused to move and thereby move the sensing element 118. The fluid connections are such that the output pressure acts upon the piston 90 and moves it sufficiently to balance the feedback force with the input.

According to the present invention, there are additional important features in the construction of the servo-actuator. There is, for example, the effect of the movement of the sensing lever 119 which is mechanically transmitted directly back to the output; and there is also an inner loop through which a positive feedback is applied to increase the forward gain of the servo-actuator force system. This is accomplished by the pressure differential between the piston chamber 95 and ambient pressure across the bushing 106 (FIG. 4) and over an effective area equal to the cross section of the rod 103. This feedback force pushes toward the rod 108 in a position between the input and output and adds to the total gain and sensitivity of the device.

PNEUMATIC TIME CONSTANT

In order to perform differentiation and integration with the pneumatic analog computer, it is necessary to provide some means for producing a time constant in the computer cycle. As mentioned above and shown in FIG. 1, this may be accomplished in the present instance by means of the combination resistance and capacitance 31, sometimes referred to as RC. The pneumatic time constant is the product of a pneumatic resistance (R) 123 and a pneumatic capacitance (C) 124. The amount of the resistance present in any particular arrangement depends upon the pressure level, the pressure drop, and whether the resistance is produced by a capillary or orifice. It has been found that a capillary resistance is the most constant and will vary only with the absolute pressure level, when all dimensions are kept constant, and such variance is inverse to the average pressure level. To keep the RC product constant, therefore, the capacitance 124 is constructed so that the volume thereof will increase with the pressure level. Accordingly, the capacitance 124 comprises a housing forming an inner chamber 125 with one wall being movable with pressure and constituting a diaphragm 126 which is suitably spring loaded with a conventional helical spring 127. As the pressure level increases in the chamber 125, it will move the diaphragm 126, thus increasing the volume and compensating for the decreasing resistance of the capillary, thereby maintaining a more uniform time constant RC.

THE MATHEMATICAL FUNCTIONS

The basic apparatus and its several components described above are adaptable to the performance of a wide variety of mathematical functions or computations, and the various components are arranged in different ways for this purpose, as will now be described. Examples of typical mathematical functions and proper module arrangement are illustrated schematically in FIGS. 9 to 16, where it will be noted that the computer arrangement in each case includes a lever 22, fulcrum 23, a plurality of carts 26, and a lever motion sensing device 43. Then, depending upon the function to be performed, one or more servo-actuators 30 and/or resistance-capacitance units 31 may be added to the other components.

The mechanical and pneumatic action that takes place in making a computation consists in balancing the lever 22 so that the sum of the torques applied thereto by the various carts will equal zero. It is therefore important that the pressure areas in all of the carts 26 be equal or the same. In each example in the following discussion, both of these conditions are present.

*Proportional gain or constant multiplier*

One of the simplest functions that can be performed with a computer unit embodying the principles of this invention is that of proportional gain or multiplication by a constant multiplier. Omitting the cart to the right of the fulcrum in FIG. 9, a proportional gain computer may comprise a basic lever with one cart on each side thereof. The lower cart, at a distance $L_1$ from fulcrum 23, receives an input pressure $P_1$, and the other cart located $L_o$ from the fulcrum has the output pressure $P_o$ connected to it. Since the pressure areas of the carts are equal, and the torques acting on the lever are balanced and therefore equal to zero, said torques may be expressed as:

$$P_oL_o=P_1L_1$$

or $$P_o=P_1\frac{L_1}{L_o}=GP_1$$

where G is a constant$=L_1/L_o$

Thus, the output signal $P_o$=a gain or constant multiplier G times the input signal $P_1$. It will be understood that before the lever is balanced, it will rotate and contact the pneumatic sensing element 43, which will cause the output pressure to be increased until the lever is ultimately in balance by feeding such increased output pressure back to the associated cart 26.

*Addition*

Figure 9:
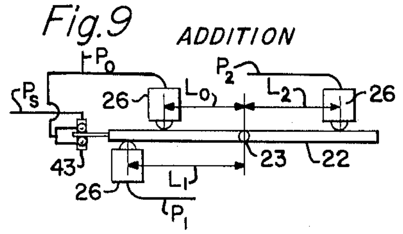
FIGS. 9–16 are schematic views of different arrangements of the components of the computer unit to show several illustrative mathematical functions that may be performed with the unit.

If a third cart is added, as shown in FIG. 9, at a distance $L_2$ to the right of the fulcrum and subjected to a second input pressure $P_2$, then the equation for the balanced torques acting on the lever will be $$P_oL_o=P_1L_1+P_2L_2$$

or $$P_o=P_1\frac{L_1}{L_o}+P_2\frac{L_2}{L_o}$$

or $$P_o=G_1P_1+G_2P_2$$

where $$G_1=\frac{L_1}{L_o}\text{ and }G_2=\frac{L_2}{L_o}$$

Thus, the output signal $P_o$ is equal to the sum of the two input signals $P_1$ and $P_2$.

*Subtraction*

Figure 10:
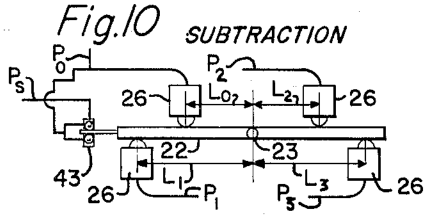

An example of subtraction is shown in FIG. 10, where a fourth cart is added on the underside of the lever, at a distance $L_3$ to the right of the fulcrum and subjected to a third input pressure signal $P_3$. The equilibrium equation for this arrangement of carts on the lever will then be $$P_oL_o=P_1L_1+P_2L_2-P_3L_3$$

or $$P_o=P_1\frac{L_1}{L_o}+P_2\frac{L_2}{L_o}-P_3\frac{L_3}{L_o}$$

Then, let $$G_1=\frac{L_1}{L_o},\ G_2=\frac{L_2}{L_o},\ \text{and}\ G_3=\frac{L_3}{L_o}$$

and $$P_o=G_1P_1+G_2P_2-G_3P_3$$

Thus, with the FIG. 10 arrangement, the output signal $P_o$ equals the sum of two input signals $P_1+P_2$—a third input $P_3$.

*Multiplication*

Figure 11:
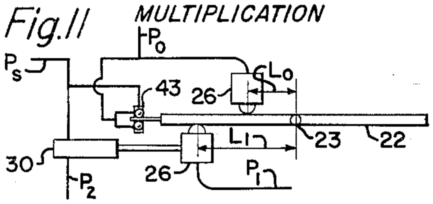

As an example of regular multiplication or squaring, FIG. 11 shows an arrangement of the carts which is similar to that discussed above for multiplication by a constant multiplier, with one cart on the top side of the lever and the second cart immediately below it. With an equilibrium condition, this would mean $$P_oL_o=P_1L_1$$

$$P_o=\frac{L_1}{L_o}P_1$$

In this instance, however, the lower signal cart is moved by a servo-positioner 30 which receives a second input signal $P_2$. In this way, the distance $L_1$ or the position of the lower cart receiving the input signal $P_1$ is a direct function of $P_2$, or $$L_1=K_mP_2$$

where $$K_m=\text{a multiplier constant}=\frac{\text{desired stroke}}{\text{range of } P_2 \text{ pressure}}$$

Substituting this in the above equation, $$P_o=\frac{K_mP_2P_1}{L_o}$$

If $$M=\text{a constant}\ \frac{K_m}{L_o}$$

then $$P_o=MP_2P_1$$

for regular multiplication. For regular squaring, make $P_2=P_1$, and then $$P_o=MP_1^2$$

*Division*

Figure 12:
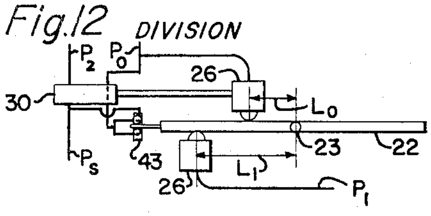

A typical arrangement of the components for a division computation is shown in FIG. 12. It will be noted in this case that a servo-actuator 30 is arranged to adjust the position of the output signal cart on the upper side of the lever. This makes the distance $L_o$ of the output signal cart a direct function of $P_2$ so that $$L_o=K_dP_2$$

where $$K_d \text{ is a division constant}=\frac{\text{desired stroke}}{\text{range of } P_2 \text{ pressure}}$$

With the lever in equilibrium, the equations for the division operation then become $$P_oL_o=P_1L_1$$

$$P_o=\frac{L_1}{L_o}P_1$$

Then, if $$L_o=K_dP_2$$

$$P_o=\frac{L_1P_1}{K_dP_2}$$

If $$D=\text{a constant}=\frac{L_1}{K_d}$$

then $$P_o=D\frac{P_1}{P_2}$$

This means that the output pressure is equal to a constant times the first input pressure divided by the second input pressure.

*Square root*

Figure 13:
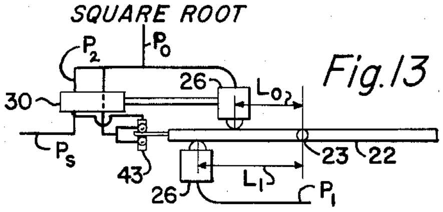

The apparatus arrangement for square root is shown in FIG. 13, where it will be observed that it is very similar to that just described for division. The signal cart for the output pressure $P_o$ is positioned by a servo-actuator so that its distance $L_o$ from the fulcrum is a direct function of $P_2$, or $$L_o=K_dP_2$$

where $$K_d=\frac{\text{desired stroke}}{\text{range of } P_2 \text{ pressure}}$$

In the equation derived above for division, $$P_o=D\frac{P_1}{P_2}$$

In operation, the output pressure $P_o$ is regulated to be equal to the second input pressure, so that $$P_o=P_2$$

Then, $$P_o=D\frac{P_1}{P_o}$$

or $$P_o^2=DP_1$$

or $$P_o=\sqrt{DP_1}$$

Thus, the output pressure, in this instance, is equal to the square root of a constant times the input pressure $P_1$.

*Compound multiplication and division*

Figure 14:
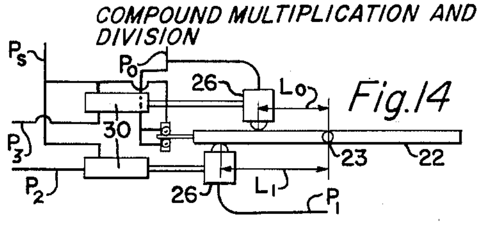

The schematic apparatus shown in FIG. 14 is designed for performing a compound multiplication and division computation and is somewhat a combination of the FIG. 11 and FIG. 12 devices in that both the upper and lower carts are moved by a servo-positioner 30. The distance $L_1$ thus is a direct function of input pressure $P_2$ so that $$L_1=K_mP_2$$

and the distance $L_o$ is a direct function of input pressure $P_3$ so that $$L_o=K_dP_3$$

The normal equilibrium equation $$P_oL_o=P_1L_1$$

may thus be changed to read $$P_o=\frac{K_mP_2P_1}{K_dP_3}$$

Next, let $$C=\text{a constant}=\frac{K_m}{K_d}$$

so that $$P_o=C\frac{P_2P_1}{P_3}$$

According to this apparatus arrangement, therefore, the output pressure $P_o$ is equal to a constant times the first input pressure multiplied by the second input pressure and divided by the third input pressure.

*Integration*

As used herein, the term "integration" means that the output is the continuous summation of the input as a function of time, or $$\int(\text{input})dt$$

Figure 15:
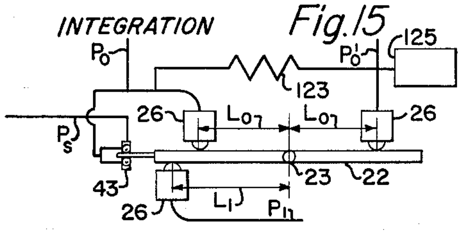

The rate of summation or integration is dependent upon the pneumatic lag or time constant, which in turn is the product of the pneumatic resistance, as produced by the capillary 123 in FIG. 1, and a pneumatic capacitance, as produced by the volume chamber 125 (FIG. 1) or RC. As shown in FIG. 15, a third signal cart is added to the basic arrangement for the constant multiplier discussed above, and this cart is arranged to operate on the lever in the same manner as the input signal cart and is positioned on the lever arm a distance equal to $L_o$ from the fulcrum. The regular output pressure is connected to this third signal cart through the pneumatic resistance 123 and capacitance or volume 125 which cause a delay or lag of the modified output pressure $P_o'$ in this third signal cart. It will be apparent that the rate of pressure change in the modified output $P_o'$ depends upon the value of the resistance and capacitance. If, during operation, the input $P_1$ is allowed to jump from zero to some predetermined value and remain there, the output will also assume a new value, depending upon the ratio of $L1/L_o$. This is called the "proportional response." The modified output pressure $P_o'$ will try to follow $P_o$ at the rate allowed by the combined resistance and capacitance RC and any change in $P_o'$ will be applied to the lever in the same direction or sense as the input $P_1$. This will cause the output pressure to be responsive to this new torque and alter its value through the sensing mechanism 43 to balance the lever. In this way, there is a continuous adding of any input change by the action of $P_o'$ so that the output will continue to sum or integrate any change of input $P_1$; that is, the output $P_o$ is the proportional plus the integrated response of $P_1$ and $P_o'$, because it is delayed, does not have any proportional response, and is merely the integral of the input $P_1$.

From the foregoing explanation and FIG. 15, it will be understood that the basic equilibrium equation is $$P_1L_1-P_oL_o+P_o'L_o=0$$

$$P_o'=\text{Delayed } P_o\frac{Po}{1+TS}$$

where $T$=RC time constant and
$S$=Laplace operator $\sim d/dt$.

Then $$P_1L_1-P_oL_o+\frac{P_oL_o}{TS+1}=0$$

or $$P_1=\frac{L_o}{L_1}\left(\frac{TS}{TS+1}\right)P_o$$

or finally $$P_o=\frac{L_1}{L_o}\left(\frac{TS+1}{TS}\right)P_1$$

(the proportional+integral); and $$P_o'=\frac{P_o}{TS+1}=\frac{L_1}{L_o}\left(\frac{1}{TS}\right)P_1$$

(the pure integral), or $$P_o'=\frac{1}{\frac{L_o}{L_1}TS}P_1$$

This shows that in pure integration, the rate of integration depends upon the RC time constant and the ratio of lever lengths.

*Differentiation*

Figure 16:
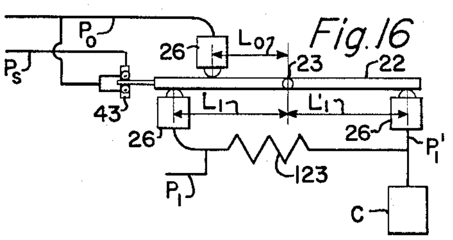

Differentiation, which is illustrated in FIG. 16, is the process of producing an output signal that is proportional to the time rate of change of the input signal.

$$P_o=\frac{dP_1}{dt}$$

This means that the faster the input changes, the higher the output will be; slower input will result in a lower output; and steady or constant input results in zero output. A pure differentiator, therefore, has a gain that starts with zero at zero frequency and increases as the frequency increases. If the gain is limited to some constant value at the higher frequency, the operation is then known as "limited differentiation."

In carrying out this function as illustrated in FIG. 16, the basic lever is provided with a cart on each side so as to produce the original proportional response:

$$P_o=\frac{L_1}{L_o}P_1$$

In this instance, however, an additional cart is added on the lower side of the lever so that it will oppose the input, and the input pressure is connected to the cart through the pneumatic resistance and pneumatic capacitance RC. This causes the pressure in the third cart $P_1'$ to be delayed. If then there is a step change in the input pressure $P_1$, such input change is gradually introduced into the system by $P_1'$ acting on the opposite side of the lever fulcrum. With the two levers $L_1$ and $L_1'$ equal in length, the input will eventually cancel itself, resulting in a zero output. Thus, there would be a limited derivative with the rate of derivative action dependent upon the rate of the pneumatic resistance and capacitance. In this instance, the rate of change of $$P_1'=1+RC\frac{d}{dt}$$

and $$P_o=\frac{L_1}{L_o}\left(1-\frac{1}{1+RC\frac{d}{dt}}\right)P_1$$

or $$P_o=\frac{L_1}{L_o}\left(1-\frac{1}{1+TS}\right)P_1$$

If a second resistance and capacitance are added to the FIG. 16 arrangement so as to delay the output pressure feeding to its cart by the same amount that the pressure $P_1'$ is delayed, the initial output change will be much greater than the step of input and thus provide pure differentiation. Expressing this in terms of output pressure, $$P_o=\frac{L_1}{L_o}RC\left(\frac{dP_1}{dt}\right)$$

or $$P_o=\frac{L_1}{L_o}TSP_1$$

In this manner, an output signal $P_o$ is produced that is proportional to the time rate of change of the input signal, and this is pure differentiation.

FLEXIBLE DEMONSTRATION COMPUTER UNIT

The schematic arrangement shown in FIG. 1 was devised to provide a flexible demonstration unit with which all of the mathematical functions can be performed merely by changing pressure connections. It differs from the more detailed construction of FIGS. 2–7, in several important respects which account for its flexibility. For example, the chamber 130 to the left of the piston 110 is connected by a conduit 131 with a pressure manifold 132 having a plurality of pressure lines connected thereto under control of suitable valves 133. The sensing device 43 has both inlets connected to supply pressure and has a pressure line $P_A$ connected to the upper outlet port 77 and a line $P_B$ connected to the lower outlet port. These lines $P_A$ and $P_B$ are under the control of valves 134 and run to a manifold 135 to which a single output pressure line $P_o$ is connected. The inlet ports of the servo-sensor 118 are also connected to the supply pressure. The RC 31 has pressure lines $P_o$ and $P_o'$ connected to corresponding lines in the manifolds 132. Finally, for ease of manipulation, carts A and B are interconnected by a tie rod 136.

Each of the carts A, B, C, and D has its pressure line connected to a manifold 132, as indicated. All of the manifolds may be connected to any suitable source of fluid pressure when the FIG. 1 apparatus is to be demonstrated and the input pressures $P_1$, $P_2$ and $P_3$, etc., are derived from this source by means of suitable regulators (not shown). The output pressures $P_o$ and $P_o'$ are then determined by the particular mathematical function for which the FIG. 1 apparatus is set to perform. The demonstration apparatus of FIG. 1 is specifically designed and set up for the process industry standard pressure range of 3–15 p.s.i. The supply pressure $P_s$ is preferably above this operating range, at 30 p.s.i., for example, to insure effective operation of the sensing devices 43 and 118. The constant pressure $P_c$ is set at 3 p.s.i.; and in the case of $P_{c\ Var}$, the pressure is set at the level about which integration or differentiation is to take place. The set pressure $P_{set}$ shown in the chart is only applied to the servo-diaphragms to cause the servo to be fully extended at the outset of the operations in which the servo is used. As mentioned above, the pressures $P_1$, $P_2$ and $P_3$ are the variable pressures, which are selected and set (within the operating range) by the demonstrator or operator to illustrate the examples; and the output pressures $P_o$ and $P_o'$ are the result of the particular mathematical function being performed. In all examples in the chart below, carts C and D are fixed (except for minor adjustments) toward the right-hand end of the lever 22. Where the servo is used in the computation, carts A and B will be positioned by said servo; and in those functions where the servo is not used, it is adjusted or set to position the carts A and B in about the positions shown in FIG. 1.

As already indicated, each pressure is under the control of a valve 133 or 134, and by opening certain valves and closing others, all of the functions described above may be performed with this single flexible unit. The manner of arranging the various pressures supplied to carts A, B, C, and D, and the other parts of the apparatus for performing the various functions by opening or closing the associated valves 133 or 134, is clearly shown in the chart below.

| | Sensor | Carts | | | | | |
|---|---|---|---|---|---|---|---|
| Function | $P_o$ | A | B | C | D | Servo | $P_{set}$ |
| Multiplication | $P_b$ | $P_1$ | $P_c$ | $P_o$ | $P_c$ | $P_2$ | 15 p.s.i. |
| Squaring | $P_b$ | $P_1$ | $P_c$ | $P_o$ | $P_c$ | $P_1$ | 15 p.s.i. |
| Division | $P_a$ | $P_o$ | $P_c$ | $P_1$ | $P_c$ | $P_1$ | 15 p.s.i. |
| Square root | $P_a$ | $P_o$ | $P_c$ | $P_1$ | $P_c$ | $P_o$ | 15 p.s.i. |
| Addition | $P_b$ | $P_1$ | ---------- | $P_o$ | $P_2$ | ---------- | 3–15 p.s.i. |
| Subtraction | $P_b$ | $P_1$ | $P_2$ | $P_o$ | ---------- | ---------- | 3–15 p.s.i. |
| Add + Subtract | $P_b$ | $P_1$ | $P_3$ | $P_o$ | $P_2$ | ---------- | 3–15 p.s.i. |
| Integration | $P_b$ | $P_1$ | $P_{c\ Var}$ | $P_o$ | $P_o'$ | ---------- | 3–15 p.s.i. |
| Differentiation | $P_b$ | $P_1$ | $P_1'$ | $P_o$ | $P_{c\ Var}$ | ---------- | 3–15 p.s.i. |

By selecting a function from the chart and applying the pressures indicated to the appropriate parts of the FIG. 1 apparatus, it is possible to produce another set of schematics similar to FIGS. 9 to 16. Because of the use of four carts for each function in FIG. 1, however, it will be apparent that such schematics will be slightly different from FIGS. 9 to 16, though the torque equations will work out the same.

It will be readily understood by those skilled in the art that various changes may be made in the construction of the pneumatic analog computer and certain features thereof may be employed without others without departing from the invention or sacrificing any of its advantages.

We claim:

1. A pneumatic analog computer unit adapted to be connected to a source of fluid under pneumatic pressure for performing a plurality of mathematical functions, comprising:

(a) a stationary fulcrum;
(b) a lever mounted for limited movement about said fulcrum and having an upper and a lower side;
(c) sensing means operatively associated with said lever for sensing movement thereof and controlling fluid pressure flow in response thereto;
(d) guide means spaced from and extending substantially parallel with said lever at at least one of said sides;
(e) a carrier mounted on said guide means for adjustment longitudinally relative to said lever;
(f) pressure responsive force applying means on said carrier for movement therewith, said pressure responsive means being operative to apply a force to said lever; and
(g) means establishing communication between said sensing means and said pressure responsive means for transmitting fluid under pressure to the latter to cause it to apply force to said lever.

2. A pneumatic analog computer unit adapted to be connected to a source of fluid under pneumatic pressure for performing a plurality of mathematical functions, comprising:

(a) a stationary fulcrum;
(b) a lever mounted for limited movement about said fulcrum and having an upper and a lower side;
(c) sensing means operatively associated with said lever for sensing movement thereof and controlling fluid pressure flow in response thereto;
(d) guide means spaced from and extending substantially parallel with said lever at at least one of said sides;
(e) a carrier mounted on said guide means for adjustment longitudinally relative to said lever;
(f) pressure responsive force applying means on said carrier for movement therewith, said pressure responsive means being operative to apply a force to said lever;
(g) means establishing communication between said sensing means and said pressure responsive means for transmitting fluid under pressure to the latter to cause it to apply force to said lever; and
(h) servo means for adjusting said carrier longitudinally of the guide means therefor in response to predetermined changes in a fluid pressure.

3. A pneumatic analog computer unit adapted to be connected to a source of fluid under pneumatic pressure for performing a plurality of mathematical functions, comprising:

(a) a stationary fulcrum;
(b) a lever mounted for limited movement about said fulcrum and having an upper and a lower side;
(c) sensing means operatively associated with said lever for sensing movement thereof and controlling fluid pressure flow in response thereto;

(d) guide means spaced from and extending substantially parallel with said lever at at least one of said sides;
(e) carriers mounted on said guide means for adjustment longitudinally relative to said lever;
(f) pressure responsive force applying means on said carriers for movement therewith, said pressure responsive means being operative to apply forces to said lever;
(g) means establishing communication between said sensing means and said pressure responsive means for transmitting fluid under pressure to the latter to cause them to apply forces to said lever;
(h) servo means for adjusting one of said carriers longitudinally of the guide means therefor in response to predetermined changes in a fluid pressure; and
(i) means for transmitting fluid under pressure between said sensing means and said servo means in response to predetermined changes in pneumatic pressure.

4. A fluid pressure operated analog computer unit adapted to be connected to a source of fluid pressure for performing a plurality of mathematical functions, comprising:
(a) a supporting frame having a pair of parallel track members mounted therein and a fulcrumed lever arranged between said parallel track members;
(b) sensing means operatively associated with said lever for sensing movement thereof and controlling fluid pressure flow in response thereto;
(c) a carrier mounted on each of said track members for adjustment longitudinally relative to said lever;
(d) pressure responsive force applying means on said carriers for movement therewith, said pressure responsive means being operative to apply forces to said lever; and
(e) means establishing communication between said sensing means and at least one of said pressure responsive means for transmitting fluid under pressure to the latter to cause it to apply force to said lever, the other pressure responsive means receiving fluid pressure from another source.

5. A fluid pressure operated analog computer unit adapted to be connected to a source of fluid pressure for performing a plurality of mathematical functions, comprising:
(a) a supporting frame having a pair of parallel track members mounted therein and a fulcrumed lever arranged between said parallel track members;
(b) sensing means operatively associated with said lever for sensing movement thereof and controlling fluid pressure flow in response to balance of said lever;
(c) fluid pressure operated force applying means movably mounted on said parallel track members and arranged to apply opposing forces to said fulcrumed lever;
(d) means for transmitting fluid pressure from said sensing means to at least one of said force applying means to effect a balancing of said fulcrumed lever;
(e) servo means mounted on said supporting frame and connected with one of said force applying means to adjust the same axially of said lever in response to predetermined changes in fluid pressure; and
(f) control means including a feedback connected with a movable part of said servo means for governing the operation of said servo means.

6. A pneumatic analog computer unit adapted to be connected to a source of fluid under pressure for performing a plurality of mathematical functions, comprising:
(a) a stationary fulcrum;
(b) a lever mounted for limited movement about said fulcrum and having a finger on one end thereof;
(c) pneumatically actuated force applying means arranged to apply opposing forces to said lever;
(d) a member forming a cylindrical valve chamber with an opening intermediate the ends, said member having fluid pressure inlet ports adjacent the ends and outlet ports at the sides of said opening, the finger on said lever extending into said opening;
(e) a ball valve disposed for movement in said cylindrical valve chamber on each side of said finger, fluid pressure from said inlet ports urging said ball valves into contact with said finger to be normally held thereby in a predetermined position of said lever to block said outlet ports, movement of said lever from said predetermined position serving to dispose one ball valve in position to connect an inlet port with an outlet port and the other outlet port with the ambient atmosphere; and
(f) means establishing communication between at least one of the outlet ports of said member and one of said force applying means.

7. A pneumatic analog computer unit adapted to be connected to a source of fluid under pressure for performing a plurality of mathematical functions, comprising:
(a) a stationary fulcrum;
(b) a lever mounted for limited movement about said fulcrum and having a finger on one end thereof;
(c) pneumatically actuated force applying means arranged to apply opposing forces to said lever;
(d) a member forming a valve chamber with fluid pressure inlet and outlet port means;
(e) valve means in said valve chamber and engaged for movement by the finger on said lever, said valve means being exposed to fluid pressures in said valve chamber to exert equal and opposed forces on said finger and normally disposed thereby to close said outlet port means; and
(f) means establishing communication between the outlet port means and said force applying means.

8. A pneumatic analog computer unit adapted to be connected to a source of fluid under pressure for performing a plurality of mathematical functions, comprising:
(a) a stationary fulcrum;
(b) a lever mounted for limited movement about said fulcrum and having a finger on one end thereof;
(c) pneumatically actuated force applying means arranged to apply opposing forces to said lever;
(d) sensing means adapted to be actuated by said finger, said sensing means comprising a valve chamber having fluid inlet and outlet ports, and a valve member normally closing said outlet and movable by said finger to a position permitting fluid to flow from said inlet to said outlet;
(e) servo means arranged to adjust the position of one of said force applying means; and
(f) means for transmitting fluid from the outlet of said sensing means to said force applying means and for controlling said servo means so that said servo means may vary the position of said force applying means in response to changes in fluid pressure.

9. A pneumatic analog computer unit adapted to be connected to a source of fluid under pressure for performing a plurality of mathematical functions, comprising:
(a) a stationary fulcrum;
(b) a lever mounted for limited movement about said fulcrum and having a finger on one end thereof;
(c) pneumatically actuated force applying means arranged to apply opposing forces to said lever;
(d) sensing means adapted to be actuated by said finger, said sensing means comprising a valve chamber having fluid inlet and outlet ports, and a valve member normally closing said outlet and movable in response to movement of said finger to a position permitting fluid to flow from said inlet to said outlet;
(e) servo means arranged to adjust the position of one of said force applying means, said servo means comprising, a housing forming a chamber, a movable wall in said chamber, means for connecting said movable wall with said force applying means, and means for applying a pressure differential to said movable wall; and (f) means for transmitting fluid from the outlet of said sensing means to said force applying means and for controlling said servo means so that said servo means may vary the position of said force applying means in response to changes in fluid pressure.

10. A pneumatic analog computer unit adapted to be connected to a source of fluid under pressure for performing a plurality of mathematical functions, comprising:

(a) a stationary fulcrum;

(b) a lever mounted for limited movement about said fulcrum and having a finger on one end thereof;

(c) pneumatically actuated force applying means arranged to apply opposing forces to said lever, each such means including a housing, a piston disposed for movement in such housing, a wheel rotatably connected to said piston and adapted to effect line contact with said lever, resilient means on said housing for accurately positioning and guiding the piston and wheel toward and away from said lever during movement thereof, and means for applying fluid under pressure to said piston;

(d) sensing means adapted to be actuated by said finger, said sensing means comprising, a valve chamber having fluid inlet and outlet ports, and a valve member normally closing said outlet and movable in response to movement of said finger to a position permitting fluid to flow from said inlet to said outlet; and (e) means for transmitting fluid from the outlet of said sensing means to the piston of one of said force applying means.

11. A pneumatic analog computer unit adapted to be connected to a source of fluid under pressure for performing a plurality of mathematical functions, comprising:

(a) a stationary fulcrum;

(b) a lever mounted for limited movement about said fulcrum and having a finger on one end thereof;

(c) pneumatically actuated force applying means arranged to apply opposing forces to said lever;

(d) sensing means adapted to be actuated by said finger, said sensing means comprising a valve chamber having fluid inlet and outlet ports, and a valve member normally closing said outlet and movable in response to movement of said finger to a position permitting fluid to flow from said inlet to said outlet to provide an output pressure;

(e) means for transmitting fluid at said output pressure to said opposed force applying means; and (f) means connected to said fluid transmitting means for introducing a time delay in the transmission of the fluid to one of said force applying means, such time delay means including a variable volume chamber with a movable wall, means yieldably resisting movement of said wall, and a capillary tube in an entrance to said chamber.

12. A pneumatic analog computer unit adapted to be connected to a source of fluid under pressure for performing a plurality of mathematical functions, comprising:

(a) a stationary fulcrum;

(b) a lever mounted for limited movement about said fulcrum and having a finger on one end thereof;

(c) pneumatically actuated force applying means arranged to apply opposing forces to said lever;

(d) sensing means adapted to be actuated by said finger, said sensing means comprising a valve chamber having fluid inlet and outlet ports, and a valve member normally closing said outlet and movable in response to movement of said finger to a position permitting fluid to flow from said inlet to said outlet;

(e) means for transmitting fluid from the outlet of said sensing means to one of said force applying means; and (f) means connected to said fluid transmitting means for introducing a time delay in the transmission of the fluid to one of said force applying means, such time delay means including a housing forming a chamber, a capillary tube for transmitting fluid to said chamber, and a spring pressed diaphragm forming a wall of said chamber which permits the effective volume of said chamber to automatically enlarge as the pressure therein is increased.

13. A pneumatic analog computer unit adapted to be connected to a source of fluid under pressure for performing a plurality of mathematical functions, comprising:

(a) a stationary fulcrum;

(b) a lever mounted for limited movement about said fulcrum and having a finger on one end thereof;

(c) pneumatically actuated force applying means arranged to apply opposing forces to said lever;

(d) first sensing means adapted to be actuated by said finger, said sensing means comprising a valve chamber having fluid inlet and outlet ports, and a valve member normally closing said outlet and movable in response to movement of said finger to a position permitting fluid to flow from said inlet to said outlet;

(e) servo means arranged to adjust the position of one of said force applying means, said servo means comprising a housing forming a chamber, a piston in said chamber having a shaft connected to said force applying means, and a second sensing means arranged in said housing adjacent to said chamber, said second sensing means being actuated in one direction by a feedback spring connected to said piston shaft and in the opposite direction by a pressure sensitive actuator receiving fluid under pressure from said outlet; and (f) means for controlling fluid at the outlet of said first sensing means from said servo means so that said servo means may act to position said force applying means in response to changes in fluid pressure.

14. A pneumatic analog computer unit adapted to be connected to a source of fluid under pneumatic pressure for performing a plurality of mathematical functions, comprising:

(a) a stationary fulcrum;

(b) a lever mounted for limited movement about said fulcrum and having an upper and a lower side;

(c) sensing means operatively associated with said lever for sensing movement thereof and controlling fluid pressure flow in response thereto;

(d) guide means extending substantially parallel with said lever at at least one of said sides;

(e) a carrier mounted on said guide means for adjustment longitudinally relative to said lever;

(f) means for locking said carrier in selected positions of adjustment on said guide means;

(g) pressure responsive force applying means on said carrier for movement therewith, said pressure responsive means being operative to apply a force to said lever; and (h) means establishing communication between said sensing means and said pressure responsive means for transmitting fluid under pressure to the latter to cause it to apply force to said lever.

15. A fluid pressure operated analog computer unit adapted to be connected to a source of fluid under pressure for performing a plurality of mathematical functions, comprising:

(a) a stationary fulcrum;

(b) a lever mounted for limited movement about said fulcrum and having an upper and a lower side;

(c) sensing means operatively associated with said lever for detecting movement thereof and controlling fluid pressure flow in response thereto;

(d) guide means extending substantially parallel with said lever at said sides;

(e) a carrier mounted on each guide means for adjustment longitudinally relative to said lever;

(f) pressure responsive force applying means on each carrier for movement therewith, said pressure responsive means being operative to apply a force to said lever;

(g) means establishing communication between said sensing means and one of said pressure responsive means for transmitting fluid under pressure to the latter to cause it to apply force to said lever;

(h) servo means for adjusting one of said carriers, said servo means having a fluid pressure responsive actuator connected with the carrier;

(i) a second sensing means communicating with and controlling the application of fluid pressure to the actuator of said servo means;

(j) means connecting a movable part of said actuator and said second sensing means for transmitting feedback signals from the former to the latter; and (k) a pressure responsive pilot means connected with said second sensing means for imparting control signals thereto to effect the operation of said servo means in response to pressure variations.

16. A fluid pressure operated analog computer unit adapted to be connected to a source of fluid under pressure for performing a plurality of mathematical functions, comprising:

(a) a stationary fulcrum;

(b) a lever mounted for limited movement about said fulcrum and having an upper and a lower side;

(c) sensing means operatively associated with said lever for detecting movement thereof and controlling fluid pressure flow in response thereto;

(d) guide means extending substantially parallel with said lever at said sides;

(e) a carrier mounted on each guide means for adjustment longitudinally relative to said lever;

(f) pressure responsive force applying means on each carrier for movement therewith, said pressure responsive means being operative to apply a force to said lever;

(g) means establishing communication between said sensing means and one of said pressure responsive means for transmitting fluid under pressure to the latter to cause it to apply force to said lever;

(h) servo means for adjusting carriers on said sides of said lever, each servo means having a fluid pressure responsive actuator connected with the carrier;

(i) a sensing means communicating with and controlling the application of fluid pressure to the actuator of the respective servo means;

(j) means connecting a movable part of each actuator and the respective sensing means for transmitting feedback signals from the former to the latter; and (k) a pressure responsive pilot means connected with each sensing means of said servo means for imparting control signals to said sensing means and effect the operation of said servo means in response to pressure variations.

17. A pneumatic analog computer unit adapted to be connected to a source of fluid under pressure for performing a plurality of mathematical functions, comprising:

(a) a stationary fulcrum;

(b) a lever mounted for limited movement about said fulcrum and having a finger on one end thereof;

(c) pneumatically actuated force applying means arranged to apply opposing forces to said lever;

(d) a member forming a valve chamber with fluid pressure inlet and outlet port means;

(e) valve means in said valve chamber and engaged for movement by the finger on said lever, said valve means being exposed to fluid pressures in said valve chamber to exert equal and opposed forces on said finger and normally disposed thereby to close said outlet port means;

(f) means for adjusting said finger to vary the relative positions of said valve means; and (g) means establishing communication between the outlet port means and said force applying means.

References Cited by the Examiner

UNITED STATES PATENTS

| | | | |
|---|---|---|---|
| 2,217,642 | 10/1940 | Luhrs. | |
| 2,285,540 | 6/1942 | Stein | 235—61 |
| 2,394,284 | 2/1946 | Berges. | |
| 2,507,498 | 5/1950 | Brown | 235—200 |
| 2,521,477 | 9/1950 | Pellettere | 235—61 |
| 2,643,055 | 6/1953 | Sorteberg | 235—61 |
| 2,910,084 | 10/1959 | Frantz | 235—200 |
| 2,918,214 | 12/1959 | Sorteberg | 235—61 |
| 2,984,218 | 5/1961 | Christianson | 121—46.5 |
| 2,985,141 | 5/1961 | Gustafson | 251—29 |
| 2,988,061 | 6/1961 | Shelly et al. | 121—46.5 |
| 2,989,950 | 6/1961 | Lockman | 121—41 |
| 2,998,804 | 9/1961 | Clement | 121—41 |
| 3,024,805 | 3/1962 | Horton. | |
| 3,086,702 | 4/1963 | Bowditch. | |
| 3,104,810 | 9/1963 | Lupfer | 235—200 |

FOREIGN PATENTS

| | | |
|---|---|---|
| 1,046,444 | 12/1953 | France. |
| 536,537 | 12/1940 | Great Britain. |

LEO SMILOW, *Primary Examiner.*

LEYLAND M. MARTIN, *Examiner.*